(12) United States Patent
Young et al.

(10) Patent No.: US 9,203,706 B2
(45) Date of Patent: *Dec. 1, 2015

(54) SYSTEM AND METHOD FOR ENABLING DEMAND-BASED POOLING OF ENDPOINT RESOURCES IN A MULTI-APPLICATION ENVIRONMENT

(71) Applicant: Nuance Communications, Inc., Burlington, MA (US)

(72) Inventors: Milan G. Young, O'Brien, OR (US); Jon Peter Shipherd, Albany, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,821

(22) Filed: Aug. 20, 2014

(65) Prior Publication Data

US 2014/0359135 A1   Dec. 4, 2014

Related U.S. Application Data

(63) Continuation of application No. 13/462,668, filed on May 2, 2012, now Pat. No. 8,825,866.

(51) Int. Cl.
| | |
|---|---|
| G06F 15/173 | (2006.01) |
| H04L 12/24 | (2006.01) |
| H04L 29/08 | (2006.01) |
| H04L 12/911 | (2013.01) |

(52) U.S. Cl.
CPC ............. *H04L 41/50* (2013.01); *H04L 47/70* (2013.01); *H04L 67/1008* (2013.01)

(58) Field of Classification Search
CPC ...... H04L 41/50; H04L 47/70; H04L 67/1008
See application file for complete search history.

(56) References Cited

U.S. PATENT DOCUMENTS 8,825,866 B2 *   9/2014   Young et al. .................. 709/226

* cited by examiner

*Primary Examiner* — Yves Dalencourt
(74) *Attorney, Agent, or Firm* — Lessani Law Group, PC

(57) ABSTRACT

A system and method is provided for enabling demand-based pooling of endpoint resources in a multi-router, multi-application hosting system. The method includes dividing a plurality of endpoints into zones. Each of a plurality of routers is assigned to one of the zones. Each router is enabled to control endpoint assignments within its zone. In the preferred embodiment, for each application hosted by the system, all requests for the application are concentrated on the minimum number of endpoints required to meet demand and fault tolerance requirements. When a request for an application comes into the system, a router will route the request to an endpoint assigned to the application, regardless of whether the endpoint is within the router's zone. If a new endpoint is needed for the application, the router will assign an endpoint within its zone to the application, and inform the other routers of the assignment.

15 Claims, 5 Drawing Sheets

SYSTEM AND METHOD FOR ENABLING DEMAND-BASED POOLING OF ENDPOINT RESOURCES IN A MULTI-APPLICATION ENVIRONMENT

RELATED APPLICATIONS

This application is a continuation of co-pending U.S. patent application Ser. No. 13/462,668, titled "System and Method for Enabling Demand-Based Pooling of Endpoint Resources in a Multi-Application Environment," and filed on May 2, 2012, the contents of which are incorporated herein by reference as if fully disclosed herein.

BACKGROUND OF THE INVENTION

1. Field of the Invention

This invention relates generally to a distributed router system and, more particularly, to enabling demand-based pooling of endpoint resources in a multi-application environment.

2. Description of the Background Art

Most companies doing business today employ one or more servers in order to handle their companies' computing needs. These servers may be located on-site or may be handled by a hosting service. A hosting service maintains a group of servers, or endpoints, and serves the computing needs of its various clients. As part of its service, the hosting entity will likely guarantee, among other things, that 1) a minimum number of sessions, or requests, by each client can be simultaneously served, 2) the latency incurred in handling the sessions, or requests, will be below a certain limit, and 3) the availability of the service over a particular time frame will be above a certain minimum.

In order to meet these service guarantees, the hosting service would typically allocate dedicated hardware to match the peak load for each of its various clients. While this is inherently inefficient and not cost-effective as most companies do not operate at peak load around the clock, sharing infrastructure has not been a viable alternative prior to this invention because sharing infrastructure implies that 1) multiple routers in the distributed router system would each attempt to assign an incoming session request to an endpoint, resulting in conflicting endpoint assignments, 2) each endpoint cache would constantly be changing in order to handle multiple applications, resulting in increased server latency, 3) preloaded resources, required by certain applications in order to preclude server latency, would be difficult to load onto constantly changing, non-dedicated endpoints; and 4) it would be difficult to comply with the minimum number of sessions guaranteed to each client. Therefore, there is a need for a system and method that enables demand-based pooling of endpoint resources in a multi-application environment while resolving the foregoing issues.

SUMMARY OF THE INVENTION

The present invention is directed to a system and method for enabling demand-based pooling of endpoint resources in a multi-application environment. The method includes dividing a plurality of endpoints on which different applications are hosted and run into zones. Each of a plurality of routers that route session requests for the hosted applications to the endpoints are then assigned to one of the zones. Each router is enabled to control endpoint assignments within its zone. An endpoint assignment specifies the hosted application(s) an endpoint will run and each router communicates endpoint assignments within its zone to all of the other plurality of routers.

In response to receiving an incoming session request for a hosted application, the request is assigned to a router. The router then determines whether or not the number of currently open sessions for the hosted application exceeds a minimum number of ports guaranteed in the system for the application. It declines the session request if both (i) the number of currently open sessions for the hosted application exceeds the minimum number of ports guaranteed for the application and (ii) accepting additional session requests for the hosted application would violate a minimum port guarantee for another hosted application. It accepts the session request if either (i) the number of currently open sessions for the hosted application does not exceed the minimum number of ports guaranteed for the application or (ii) accepting additional session requests for the hosted application would not violate any minimum port guarantees for the other hosted applications.

In response to accepting the session request, the router determines whether or not there is an available endpoint, in any zone, already assigned to handle requests for the hosted application. In response to identifying an available endpoint already assigned to handle requests for the hosted application, the router routes the request to the endpoint, but in response to determining that there is no available endpoint assigned to handle requests for the hosted application, the router assigns an endpoint in the router's zone to the subject hosted application, routes the request to the newly assigned endpoint, and notifies all of the other plurality of routers of the assignment.

In certain embodiments, for each of the hosted applications that requires a preloaded resource on an endpoint, the application is assigned to a router that will be responsible for determining whether or not the preloaded resource is loaded onto a sufficient number of endpoints to meet the demand for the application. If the responsible router determines that additional endpoint capacity is needed for the application, the responsible router loads the preloaded resource onto an additional endpoint in the router's zone and notifies the other routers that the endpoint has been assigned to the application. With respect to applications that require a preloaded resource, a hash algorithm may be used to determine the application assignments for the routers. A hash algorithm may also be used to determine zone assignments for the routers.

In certain embodiments, the session request is randomly assigned to the router. In other embodiments, the session request is assigned to the router based on a round-robin distribution of requests among routers. In still other embodiments, the session request is assigned to the router based on a load-balancing algorithm.

DETAILED DESCRIPTION OF THE PREFERRED EMBODIMENTS

The present invention provides a system and method for enabling demand-based pooling of endpoint resources in a multi-application environment having (i) a plurality of endpoints, or servers, on which different applications are hosted and run and (ii) a plurality of routers that route session requests for the hosted applications to the endpoints. In one embodiment, the hosted applications include customer service applications, such as an Interactive Voice Response (IVR) application and the session requests are requests for customer service sessions (e.g., phone requests or internet browser requests). The hosted customer service applications may "serve" client customer service applications on computing devices.

Figure 1:
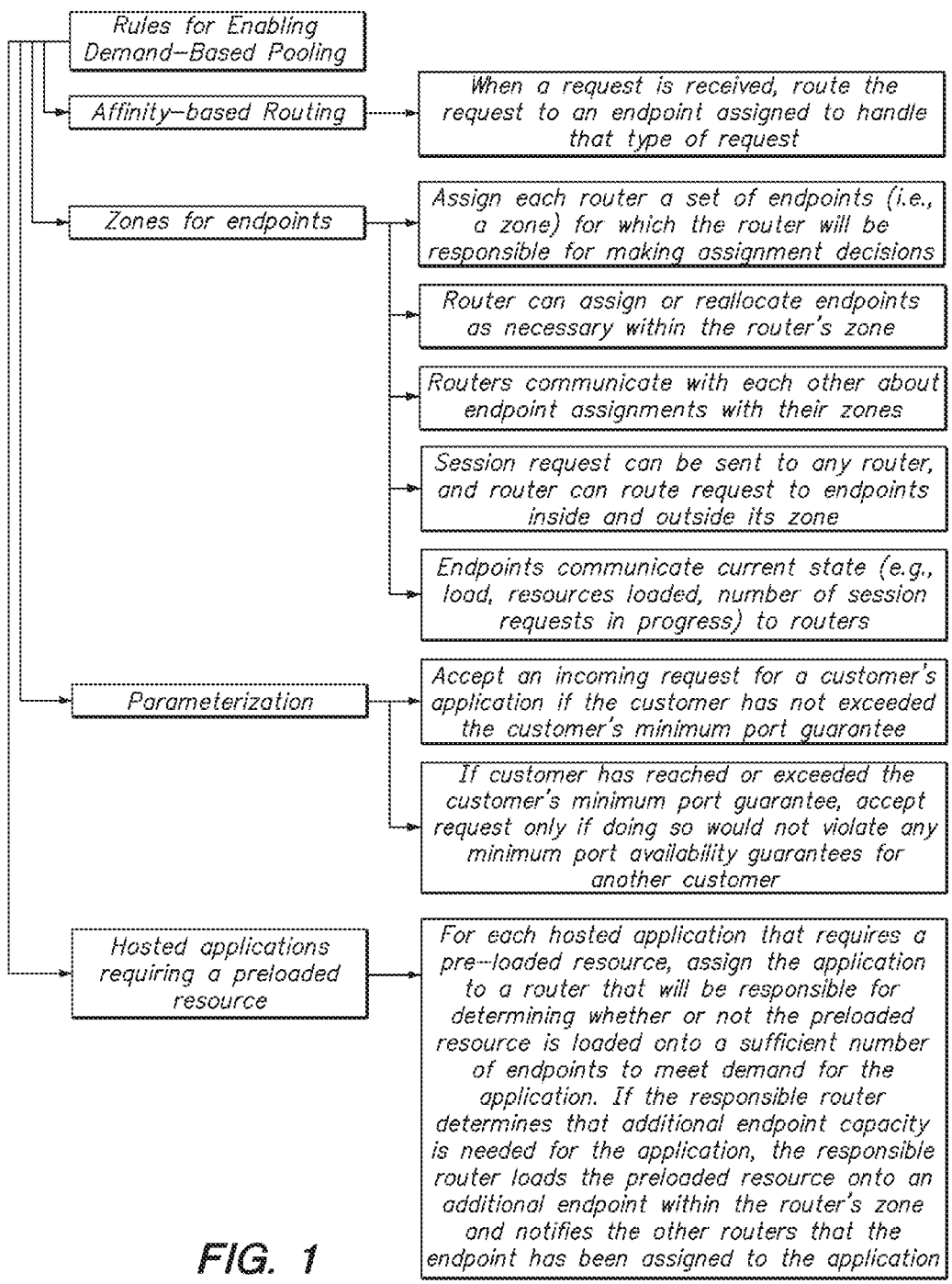
FIG. 1 is a visual map that illustrates the rules for enabling demand-based pooling according to one embodiment of the invention.

FIG. 1 is a visual map that illustrates the rules, or principles, of the system according to one embodiment of the invention. The first rule, or principle, is related to affinity-based routing of session requests. When a session request is received, the system routes the request to an endpoint assigned to handle that type of request. Routing requests to endpoints that handle that type of request reduces "thrashing of the cache," as the contents (e.g., software code or data) of the endpoint's cache would be applicable to the new session request. This reduces server latency and increases efficiency. In the preferred embodiment, for each application hosted by the system, all requests for the application are concentrated on the minimum number of endpoints required to meet demand and fault tolerance requirements.

The second rule, or principle, is related to the grouping of endpoints into zones. Each router is assigned a zone, or a set of endpoints, for which the router is responsible for making assignment decisions. Zones are dynamically adjusted as new routers come online or routers go offline. The router can assign or reallocate endpoints as necessary within its zone. Routers then communicate with each other about the endpoint assignments within their zones. This alleviates the problem of multiple routers making conflicting assignments. While a router is responsible for the assignment of the endpoints within its zone, when a session request is sent to a particular router, the router can route the session request to any endpoints both inside and outside its zone, as long as the application for the session request matches the endpoint assignment. In addition, the endpoints communicate current state (e.g., the instantaneous load, resources loaded, and number of session requests in progress) to the routers. One benefit of assigning a router responsibility for its zone is that if the demand for a particular application weakens, the router can reduce the number of endpoints in its zone that are assigned to run the application and reallocate the endpoints to another application.

The third rule, or principle, is related to the parameterization of the ports. When the system receives an incoming session request for a customer's application, the system accepts the session request if the customer has not exceeded the customer's minimum port guarantee. For example, in a system having 1000 ports, where Customer A is using 200 of its guaranteed 300 ports, Customer B is using 100 of its 300 guaranteed ports, and Customer C is using 200 of its guaranteed 300 ports (with 100 floating ports), the system will accept a new session request by any of Customers A, B, and C, because each of them are under their guaranteed allotment of ports.

If, however, the customer has already reached or exceeded the customer's minimum port guarantee, the system will only accept the request if doing so would not violate any minimum port availability guarantees for another customer. In the above example, if Customer A is currently using 400 total ports (300 of its guaranteed 300 ports plus 100 floating ports), Customer B is using 100 of its 300 guaranteed ports, and Customer C is using 200 of its 300 guaranteed ports, then the system will deny a new session request by Customer A, because doing so would violate the minimum port availability guarantees for Customers B and C. The parameterization of the ports allows the system to comply with minimum port guarantees while sharing endpoint resources. It also is more cost effective than a traditional hosting system as Customers A, B, and C would each pay to maintain their port guarantees of 300 while potentially enjoying greater than 300 ports of usage. In comparison, in the traditional system, Customers A, B, and C would each pay to maintain the port availability of their peak loads even though they may rarely reach their peak loads of usage.

The fourth rule, or principle, is related to hosted applications that require a preloaded resource. Certain applications require a preloaded resource on an endpoint in order to avoid undue server latency. One example of a preloaded resource is a file retrieved over a network using the http protocol. For each hosted application that requires a preloaded resource, the application is assigned to a router that will be responsible for determining whether or not the preloaded resource is loaded onto a sufficient number of endpoints to meet the demand for the application. If the responsible router determines that additional endpoint capacity is needed for the application, the responsible router loads the preloaded resource onto an additional endpoint within the router's zone and notifies the other routers that the endpoint has been assigned to the application.

Figure 2:
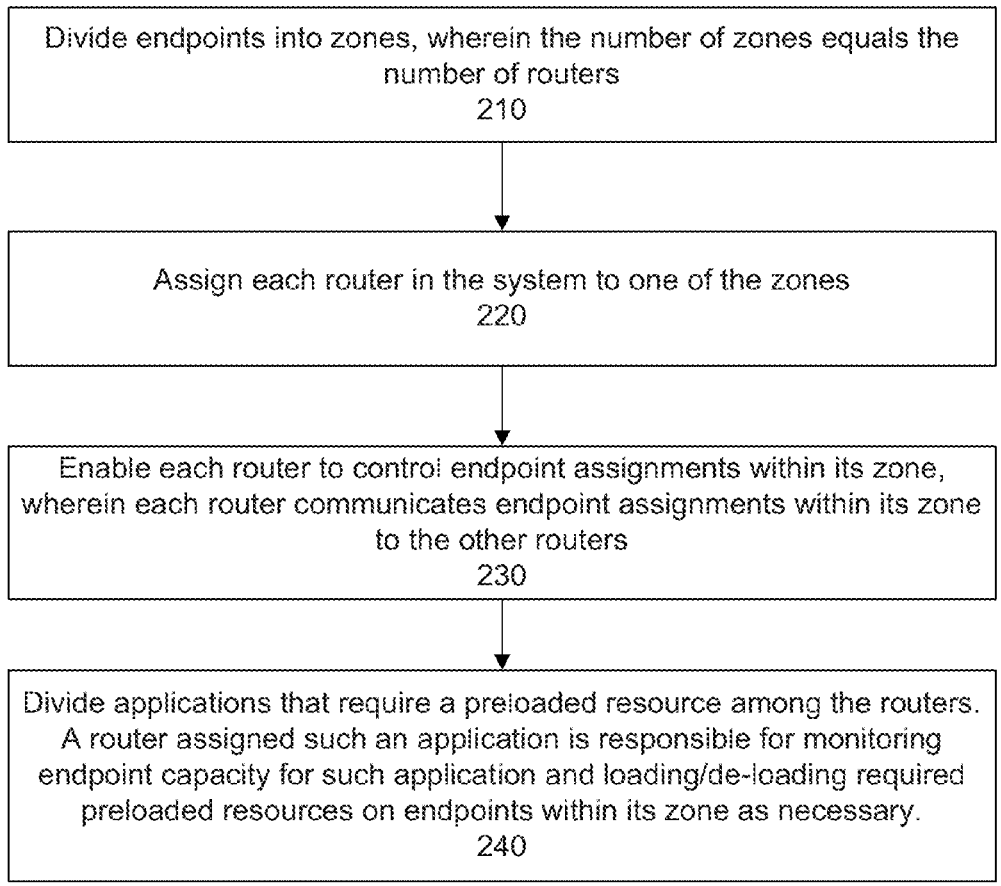
FIG. 2 is a flowchart that illustrates a method, according to one embodiment of the invention, for setting up a hosting system to perform demand-based pooling of resources in a multi-router, multi-application environment.

FIG. 2 illustrates a method, according to one embodiment of the invention, for setting up a hosting system to perform demand-based pooling of resources in a multi-router, multi-application environment. The endpoints of a given system are divided into zones, where the number of zones equals the number of routers (step 210). Each router in the system is then assigned to one of the zones (step 220). Each router is enabled to control the endpoint assignments within its zone, where an endpoint assignment specifies the hosted application(s) an endpoint will run. Each router communicates endpoint assignments within its zone to all of the other routers (step 230).

In the preferred embodiment, the routers communicate with each other (and the endpoints communicate with the routers) through multicast. This may be implemented via IP multicast using User Datagram Protocol (UDP) or Pragmatic General Multicast (PGM). Other multicast technologies may also be used, such as Explicit Multi-Unicast (XCAST) or Internet Relay Chat (IRC). A person skilled in the art would understand that other routing schemes may be used within the scope of the present invention (e.g., anycast, broadcast, unicast, and geocast, etc.).

In one embodiment, the zones of responsibility for the routers are determined by using a hash algorithm. One example of a hash algorithm used to determine the zones of responsibility may be computed as follows: Assume each endpoint can be uniquely identified with an IP address and a port number. The fields in an IP address of the endpoint and the port number are represented as hexadecimal values. The values are then concatenated into a single sequence with the values named $C_0$ to $C_{N-1}$, where N is the length of the sequence. A variable called H is initialized to zero. For each value $C_n$ in the sequence, where each index n is in the range from 0 to N−1, calculate ASCII_Value $(C_n) * 31^{(N-1-n)}$ and then add the running total to H. This usually produces a value H, which is nearly random on the address and port combination. Each router is then assigned an integer from value 0 to R−1, where R is the number of routers. H modulo R is then computed and the results are compared to the index of each router. Only one router will match, and the endpoint is assigned to that router's zone. A person skilled in the art would understand that other algorithms for determining how to assign a particular router to a zone of responsibility may be used within the scope of the present invention.

The applications that require preloaded resources are then divided among the routers. A router that is assigned such an application is responsible for monitoring the endpoint capacity for such application and loading and de-loading the required preloaded resources on the endpoints within its zone as necessary (step 240). As discussed previously the responsible router will notify all other routers that an endpoint has been assigned to a particular application.

In one embodiment, a hash algorithm is used to assign a particular router to monitor the endpoint capacity for an application requiring preloaded resources. An example of one such hash algorithm may be computed as follows: The name of the application is represented as a sequence of N ASCII characters (e.g., $C_0$ to $C_{N-1}$). A variable called H is initialized to zero. For each value $C_n$ in the sequence, where each index n is in the range from 0 to N−1, calculate ASCII_Value $(C_n)*31^{(N-1-n)}$ and then add the running total to H. Each router is assigned an integer from value 0 to R−1, where R is the number of routers. H modulo R is then computed and the results are compared to the index of each router. Only one router will match and that router is assigned to monitor resources for that application. A person skilled in the art would understand that other algorithms for determining how to assign a particular router to monitor the resources for an application may be used within the scope of the present invention.

Figure 3A:
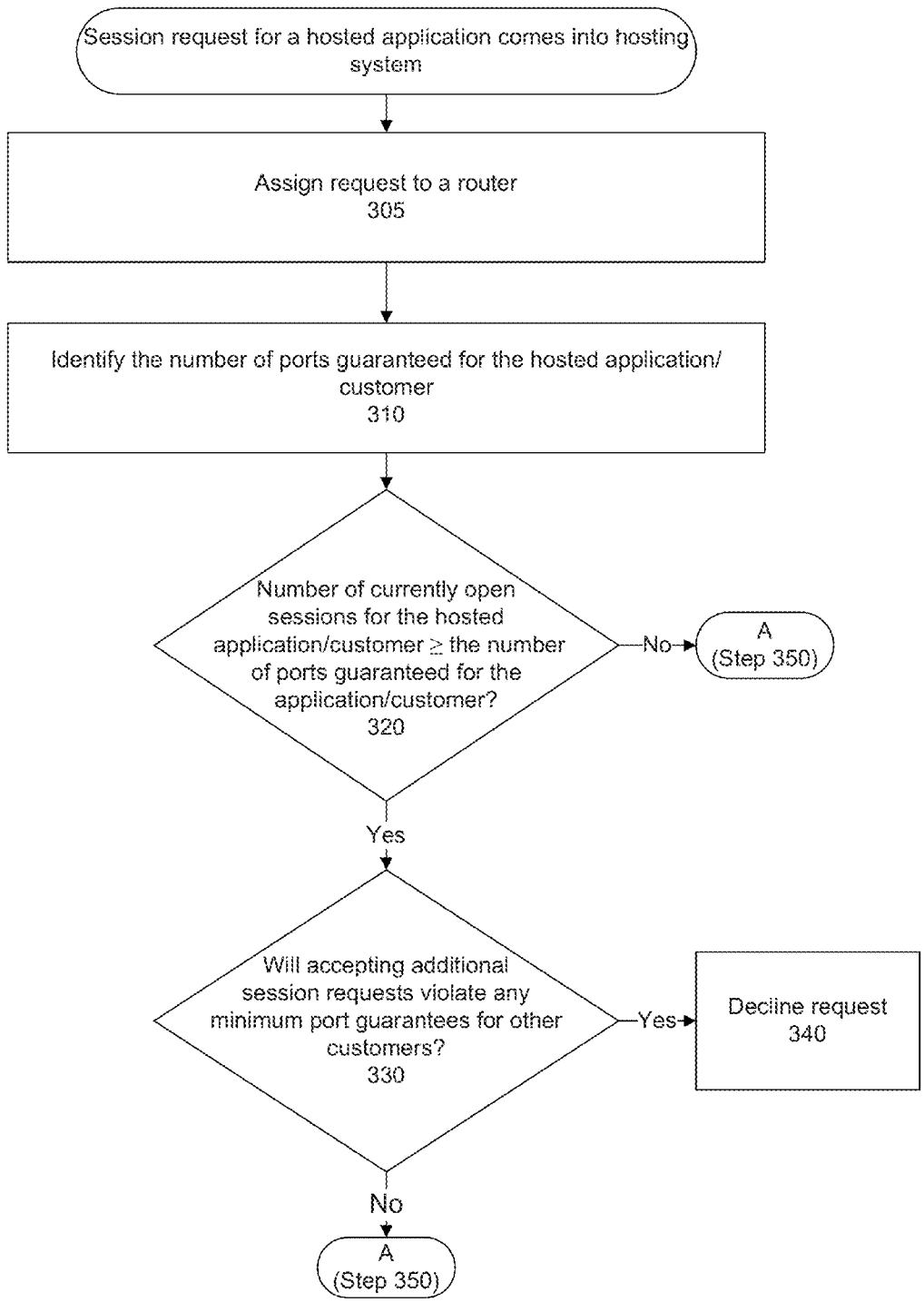
FIGS. 3a-3b are a flowchart that illustrates a method for handling and routing session requests according to one embodiment of the invention.
Figure 3B:
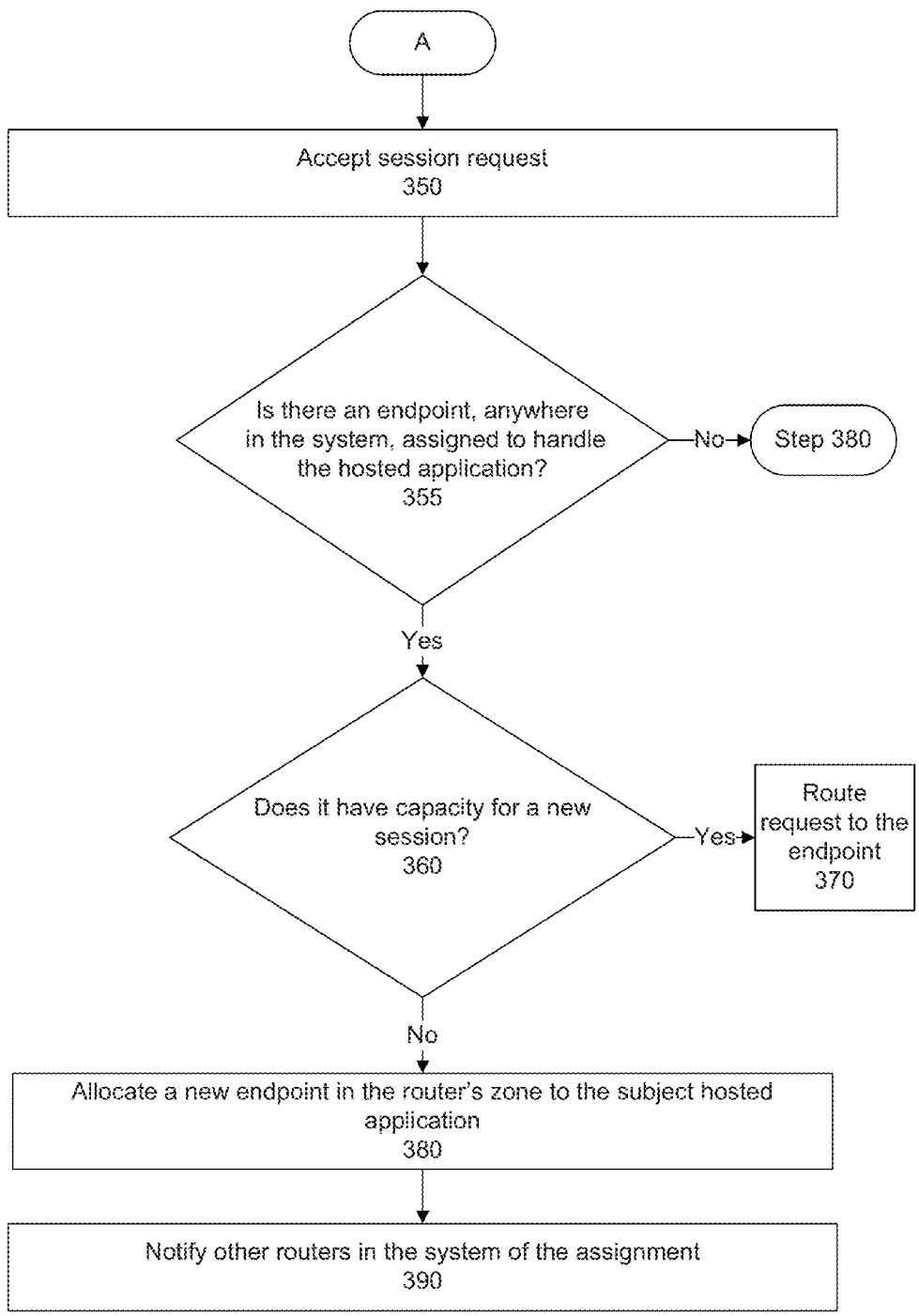

FIGS. 3a-3b illustrate a method for handling and routing session requests according to one embodiment of the invention. The hosting system receives a session request for a hosted application and assigns the session request to a router (step 305). The session request may be assigned to the router randomly (hash-based), based on a round-robin distribution of requests, or based on a load-balancing algorithm. Other algorithms not specifically named may also be employed within the scope of the present invention.

The system next identifies the number of ports guaranteed for the hosted application or customer (step 310). If the number of currently open session for the hosted application or customer is greater than or equal to the number of ports guaranteed for the application or customer (step 320), the router then determines whether accepting the additional session request will violate any of the minimum port guarantees for other customers (step 330). If accepting additional session requests will violate any minimum port guarantees for other customers, then the router declines the addition session request (step 340). If, however, the number of currently open sessions for the hosted application or customer is not greater than or equal to the number or ports guaranteed for the application or customer or accepting additional session requests would not violate any minimum port guarantees for other customers, the router accepts the new session request (step 350).

The router then determines whether there is an endpoint, anywhere in the system, assigned to handle the hosted application (step 355). If there is an endpoint already assigned to handle the hosted application, the router then determines whether it has capacity for a new session (step 360). If it does have capacity for a new session, the router routes the session request to the endpoint already assigned to handle the hosted application (step 370). If, however, there is not an endpoint, anywhere in the system, assigned to handle the hosted application or if the endpoint already assigned to handle the hosted application does not have capacity for a new session, the router allocates a new endpoint in the router's zone to the subject hosted application (step 380). The router then notifies the other routers in the system of the assignment (step 390).

In certain embodiments, for example in the case of an application requiring preloaded resources, two endpoints may always be assigned to handle that application. This avoids a situation of server latency in which the only endpoint running the application fails and the router does not have adequate time to load the required preloaded resources onto another endpoint before a new session request for the application is received from the customer. By allocating two endpoints to handle applications requiring preloaded resources, there is always one endpoint available as a backup.

In certain embodiments, an endpoint is assigned to handle more than one application at a time. The router will then assign the applications in such a way as to minimize aggregate disruption. For example, if a Router is responsible for a Zone having Endpoints 1, 2, and 3. Endpoint 1 is currently running Application A; Endpoint 2 is currently running Application B; and Endpoint 3 is currently running Application C. When the Router receives a session request for Application D, the Router may find the least loaded endpoint, for example Endpoint 1, and squeeze Application D onto Endpoint 1 along with Application A. Or, if the Router is not able to squeeze Application D onto Endpoint 1, it may put part of Application D onto Endpoint 2, or move Application A onto Endpoint 2 and allow Application D to use the entire Endpoint 1.

Figure 4:
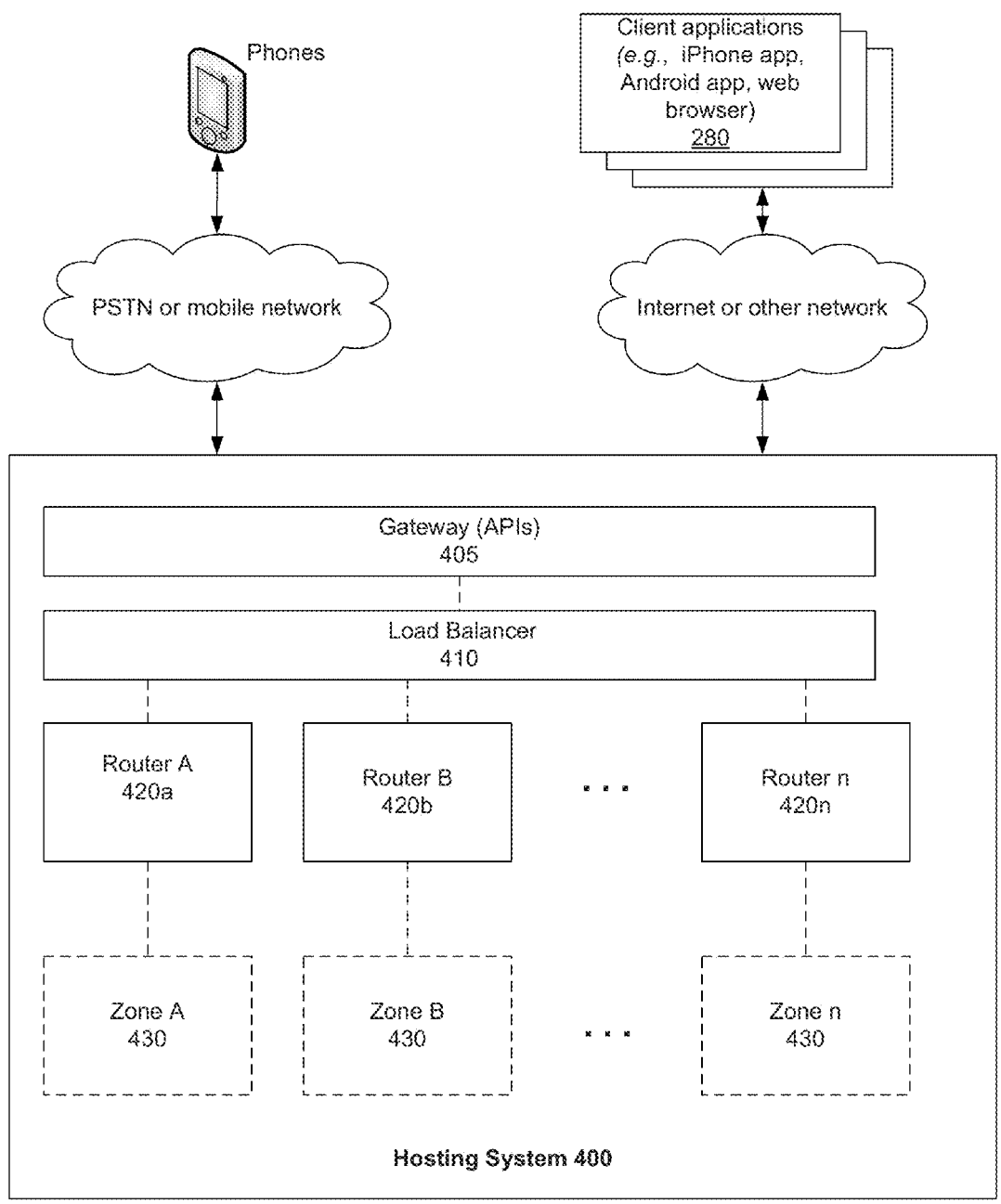
FIG. 4 is a block diagram of an exemplary software architecture for a distributed router system according to one embodiment of the invention.

FIG. 4 illustrates an exemplary system architecture for a Hosting System 400. As a person skilled in the art would understand, the system architecture may be constructed in any number of ways, having more or less modules and different interconnectivity, within the scope of the present invention. The methods of FIGS. 2 and 3a-3b may be implemented in other systems, and the invention is not limited to system 400.

Hosting System 400 has a Gateway or Application Programming Interfaces (APIs) 405, a Load Balancer 410, Routers 420, and Zones 430. The Gateway (APIs) 405 may interface with mobile devices through a PSTN or mobile network or client applications (e.g., iPhone applications, Android applications, web browsers, etc.) 280 through the internet or other network systems. The Load Balancer 410 distributes the session requests to the routers randomly (e.g., hash-based), by a round-robin distribution of requests, or by a load-balancing algorithm. The Load Balancer 410 may also use other algorithms within the scope of the present invention. Router A through Router n 420a-420n function to assign or allocate endpoints as necessary within their zones and to route session requests for hosted applications to endpoints both inside and outside their zones. Zone A through Zone n 430 each include a plurality of endpoints that are dynamically distributed based on the number of routers and the number of endpoints available for hosting and running different applications within the Hosting System 400.

The methods described with respect to FIGS. 2 and 3a-3b are embodied in software and performed by a computer system executing the software. A person skilled in the art would understand that a computer system has a memory or other physical storage medium for storing software instructions and one or more processors for executing the software instructions.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for enabling demand-based pooling of endpoint resources in a system that includes (i) a plurality of endpoints on which different applications are hosted and run and (ii) a plurality of routers that route session requests for the hosted applications to the endpoints, the method comprising:
    dividing the endpoints into zones;
    assigning each of the plurality of routers to one of the zones;
    enabling each router to control endpoint assignments within its zone, wherein an endpoint assignment specifies the one or more hosted applications an endpoint will run and wherein each router communicates the endpoint assignments within its zone to all of the other routers in the plurality of routers; and
    in response to receiving an incoming session request for a hosted application, assigning the request to a router, wherein the router performs the following:
        determining whether or not the number of currently open sessions for the hosted application exceeds a minimum number of ports guaranteed in the system for the application;
        declining the session request if both (i) the number of currently open sessions for the hosted application exceeds the minimum number of ports guaranteed for the application and (ii) accepting additional session requests for the hosted application would violate a minimum port guarantee for another hosted application;
        accepting the session request if either (i) the number of currently open sessions for the hosted application does not exceed the minimum number of ports guaranteed for the application or (ii) accepting additional session requests for the hosted application would not violate any minimum port guarantees for the other hosted applications; and
        in response to accepting the session request, assigning an endpoint to the hosted application, routing the request to the assigned endpoint, and notifying all of the other routers in the plurality of routers of the assignment.

2. The method of claim 1, further comprising:
    for each of the hosted applications that requires a preloaded resource on an endpoint, assigning the application to a router that will be responsible for determining whether or not the preloaded resource is loaded onto a sufficient number of endpoints to meet demand for the application, wherein, if the responsible router determines that additional endpoint capacity is needed for the application, the responsible router loads the preloaded resource onto an additional endpoint in the router's zone and notifies other routers that the endpoint has been assigned to the application.

3. The method of claim 2, wherein, with respect to applications that require a preloaded resource, a hash algorithm is used to determine the application assignments for the routers.

4. The method of claim 1, wherein a hash algorithm is used to determine zone assignments for the routers.

5. The method of claim 1, wherein the session request is randomly assigned to the router.

6. The method of claim 1, wherein the session request is assigned to the router based on a round-robin distribution of requests among routers.

7. The method of claim 1, wherein the session request is assigned to the router based on a load-balancing algorithm.

8. A computer program embodied on a non-transitory computer-readable medium and comprising code, that, when executed by a computer system, enables the computer system to perform the following method for enabling demand-based pooling of endpoint resources in a system that includes (i) a plurality of endpoints on which different applications are hosted and run and (ii) a plurality of routers that route session requests for the hosted applications to the endpoints, the method comprising:
    dividing the endpoints into zones;
    assigning each of the plurality of routers to one of the zones;
    enabling each router to control endpoint assignments within its zone, wherein an endpoint assignment specifies the one or more hosted applications an endpoint will run and wherein each router communicates the endpoint assignments within its zone to all of the other routers in the plurality of routers; and
    in response to receiving an incoming session request for a hosted application, assigning the request to a router, wherein the router performs the following:
        determining whether or not the number of currently open sessions for the hosted application exceeds a minimum number of ports guaranteed in the system for the application;
        declining the session request if both (i) the number of currently open sessions for the hosted application exceeds the minimum number of ports guaranteed for the application and (ii) accepting additional session requests for the hosted application would violate a minimum port guarantee for another hosted application;
        accepting the session request if either (i) the number of currently open sessions for the hosted application does not exceed the minimum number of ports guaranteed for the application or (ii) accepting additional session requests for the hosted application would not violate any minimum port guarantees for the other hosted applications; and
        in response to accepting the session request, assigning an endpoint to the hosted application, routing the request to the assigned endpoint, and notifying all of the other routers in the plurality of routers of the assignment.

9. The computer program of claim 8, further comprising:
    for each of the hosted applications that requires a preloaded resource on an endpoint, assigning the application to a router that will be responsible for determining whether or not the preloaded resource is loaded onto a sufficient number of endpoints to meet demand for the application, wherein, if the responsible router determines that additional endpoint capacity is needed for the application, the responsible router loads the preloaded resource onto an additional endpoint in the router's zone and notifies other router's routers that the endpoint has been assigned to the application.

10. The computer program of claim 9, wherein, with respect to applications that require a preloaded resource, a hash algorithm is used to determine the application assignments for the routers.

11. The computer program of claim 8, wherein a hash algorithm is used to determine zone assignments for the routers.

12. A computer system for enabling demand-based pooling of endpoint resources, wherein the system includes (i) a plurality of endpoints on which different applications are hosted and run and (ii) a plurality of routers that route session requests for the hosted applications to the endpoints, the system comprising:

a processor;

a memory coupled to the processor, wherein the memory stores instructions that, when executed by the processor, causes the system to perform the operations of:

dividing the endpoints into zones;

assigning each of the plurality of routers to one of the zones;

enabling each router to control endpoint assignments within its zone, wherein an endpoint assignment specifies the one or more hosted applications an endpoint will run and wherein each router communicates the endpoint assignments within its zone to all of the other routers in the plurality of routers; and in response to receiving an incoming session request for a hosted application, assigning the request to a router, wherein the router performs the following:

determining whether or not the number of currently open sessions for the hosted application exceeds a minimum number of ports guaranteed in the system for the application;

declining the session request if both (i) the number of currently open sessions for the hosted application exceeds the minimum number of ports guaranteed for the application and (ii) accepting additional session requests for the hosted application would violate a minimum port guarantee for another hosted application;

accepting the session request if either (i) the number of currently open sessions for the hosted application does not exceed the minimum number of ports guaranteed for the application or (ii) accepting additional session requests for the hosted application would not violate any minimum port guarantees for the other hosted applications; and in response to accepting the session request, assigning an endpoint to the hosted application, routing the request to the assigned endpoint, and notifying all of the other routers in the plurality of routers of the assignment.

13. The computer system of claim 12, further comprising:

for each of the hosted applications that requires a preloaded resource on an endpoint, assigning the application to a router that will be responsible for determining whether or not the preloaded resource is loaded onto a sufficient number of endpoints to meet demand for the application, wherein, if the responsible router determines that additional endpoint capacity is needed for the application, the responsible router loads the preloaded resource onto an additional endpoint in the router's zone and notifies other routers that the endpoint has been assigned to the application.

14. The computer system of claim 13, wherein, with respect to applications that require a preloaded resource, a hash algorithm is used to determine the application assignments for the routers.

15. The computer system of claim 12, wherein a hash algorithm is used to determine zone assignments for the routers.

* * * * *